UNITED STATES PATENT OFFICE.

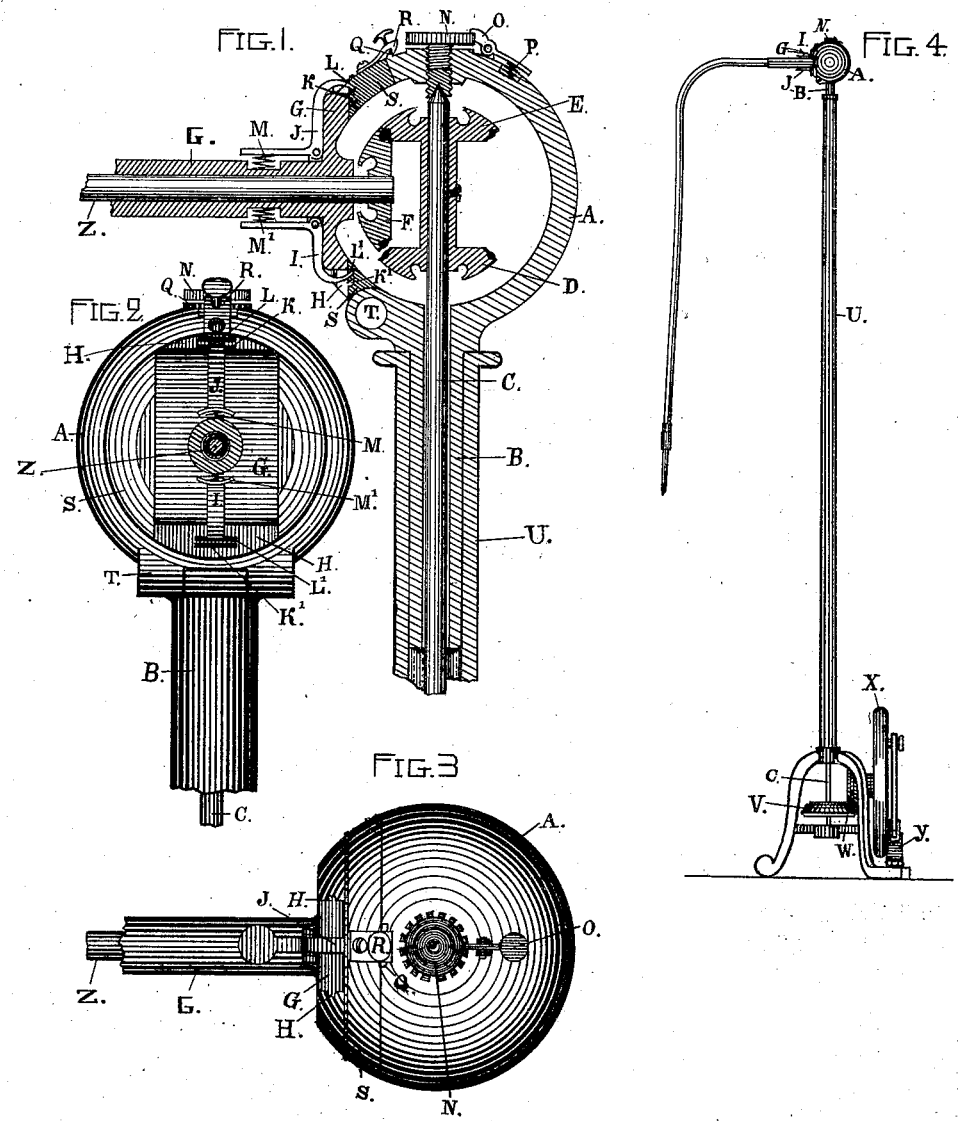

WILLIAM A. KNOWLES, OF ALAMEDA, CALIFORNIA.

DENTAL ENGINE.

SPECIFICATION forming part of Letters Patent No. 373,141, dated November 15, 1887.

Application filed July 14, 1887. Serial No. 241,537. (No model.)

*To all whom it may concern:*

Be it known that I, WILLIAM A. KNOWLES, a citizen of the United States, residing in the city and county of Alameda, and State of California, have invented a new and useful Dental Engine, of which the following is a specification.

My invention relates to improvements in dental engines, which will be understood by reference to the accompanying drawings and the letters referring thereto.

Figure 1 is a broken sectional view showing the machine cut vertically through the center; Fig. 2, a broken front elevation; Fig. 3, a broken plan view, and Fig. 4 an elevation of the machine upon a reduced scale.

A represents the head-block which forms the outer shell, which supports the gear; B, the pivot post or sleeve; C, the driving-spindle; D and E, the miter driving-wheels; F, the pinion which gives motion to the cable-rod by means of the journal-sleeve; G, the sliding bearing for the cable-rod; H, the guide-groove for the sliding bearing G to operate in; I and J the lock-levers.

K and K' L and L' are the lock-notches, in which the lock-levers I and J operate; M and M', the returning-springs which operate the lock-levers I and J in locking the sliding bearing G in place.

N represents the adjustable bearing for the spindle C to operate in.

O represents the lock-lever, and P the lock-spring for holding the bearing N from turning.

Q represents the lock-notch for the spring R to catch upon.

R represents the lock-spring for holding the door S when closed.

S represents the door which supports the sliding bearing for the cable-rod and allows egress to the gearing D and E, and allows the cable-rod to tip down to a vertical position when not in use.

T represents the hinge for the door S.

U represents the supporting-sleeve for the head-block A and the main driving-spindle.

V and W represent miter-gear connected with the foot-power, X the fly-wheel, and Y the treadle; Z, the sleeve of the cable-rod, which serves as a bearing for the pinion F, by which it is revolved.

The following is the construction of my improved dental engine: I construct the whole of such metal as is generally employed in that class of machinery, except that I sometimes face the gear D, E, and F with rubber instead of metal teeth, to afford a noiseless movement. I bore the hole in the pivot-sleeve B sufficiently large to allow the spindle C to revolve in the same freely, but sufficiently close to insure steadiness. I form the sliding bearing G heavy enough to support an extension long enough to supply any required bearing for the cable-sleeve Z, and to allow the attachment of the catch or lock levers I and J and the springs M and M'. I form the groove H with side guide-grooves, as shown in Fig. 3, at H H in the door S. I hinge the door S at T, and attach the catch-spring R at the top to interlock with the lock-notch Q. I form the lock-notches K and K' and L and L' to receive the end of the lock-levers I and J for the purpose of locking the sliding bearing G. I employ a concave bearing for the top of the spindle C, which may be turned down upon the conical point of the spindle C.

The following is the operation of my improved dental engine: The pivot-sleeve B revolves easily in the supporting-sleeve U, and the cable-rod is readily turned in any required direction horizontally. The spindle C being revolved by the foot-treadle, the wheels D and E are consequently revolved, and the pinion F, being in gear with the wheel E, as shown in Fig. 1, is also revolved, thereby giving motion to the drill-cable, which is operated in the usual way. To reverse the motion of the drill or other instrument employed in working on the teeth, the thumb and finger are pressed upon the levers I and J over the springs M and M', and the lever J is withdrawn from the notch L and the lever I from the notch L', and the bearing or slide G is let down until the pinion F impinges upon the wheel D. The levers I and J are then released and catch into the notches K and K', thus firmly locking the pinion and the wheel D in gear, thereby causing the pinion F to revolve in an opposite direction. To tip the cable down to a vertical position the spring-catch R is raised from the lock-notch Q, when the door S opens freely and the cable is allowed to hang vertically.

Having thus described my invention, what I claim, and desire to secure by Letters Patent, is—

1. The head block or shell A, with guide-groove H and pivot-post B, and door S, hinged at T, having the sliding adjustable bearing G, catch-notches K, L, K', and L', the levers I and J, springs M and M', the lock-notch Q, the catch-spring R, adjustable bearing N, catch-lever O, and spring P, in combination with the supporting-sleeve U, for the purpose of supporting the gear D, E, and F and giving motion to the same by means of the spindle C, constructed and operated substantially as and for the purposes set forth.

2. The door S, in combination with the head-block A by means of the hinge T, the lock-notch Q and catch-spring R, for the purpose of placing the pinion F in gear with any corresponding gear and tipping the cable-rod down to a vertical position, constructed and operated substantially as and for the purposes set forth.

3. The sliding bearing G, in combination with the door S by means of the groove H, the lock-notches K, L, K', and L', the levers I and J, and springs M and M', for the purpose of reversing the motion of the pinion F by sliding up and down and bringing it alternately in gear with the wheels D and E, as described, constructed and operated substantially as and for the purposes set forth.

4. The combination, with the sliding bearing G, of the levers I and J, the springs M and M', the lock-notches K and L and K' and L', for the purpose of adjusting and locking the same, constructed and operated substantially as and for the purposes set forth.

WILLIAM A. KNOWLES.

Witnesses:
 E. H. THARP,
 JOHN H. REDSTONE.